United States Patent
Chatrefou

Patent Number: 5,886,265
Date of Patent: Mar. 23, 1999

[54] OPTICAL VIBRATION SENSOR

[75] Inventor: Denis Chatrefou, Epinay Sous Senart, France

[73] Assignee: GEC Alsthom T & D Balteau, Montrouge, France

[21] Appl. No.: 804,464

[22] Filed: Feb. 21, 1997

[30] Foreign Application Priority Data

Feb. 22, 1996 [FR] France .................................. 96 02196

[51] Int. Cl.⁶ .............................. G01H 1/12; G01H 9/00
[52] U.S. Cl. ................. 73/651; 73/653; 73/655; 73/657; 250/227.29
[58] Field of Search .............................. 73/653, 654, 655, 73/656, 657, 643, 632, 651; 382/12, 13, 78, 80, 84; 250/227.11, 227.27, 227.28, 227.29; 364/508

[56] References Cited

U.S. PATENT DOCUMENTS

| | | | |
|---|---|---|---|
| 4,569,570 | 2/1986 | Brogardh et al. | 350/96.34 |
| 4,584,883 | 4/1986 | Miyoshi et al. | 73/861.24 |
| 4,772,786 | 9/1988 | Langdon | 250/231 R |
| 4,905,519 | 3/1990 | Makowski | 73/657 |
| 5,063,781 | 11/1991 | Conforti et al. | 73/651 |
| 5,207,766 | 5/1993 | Conforti et al. | 73/653 |
| 5,249,163 | 9/1993 | Erickson | 367/149 |
| 5,339,289 | 8/1994 | Erickson | 367/149 |

FOREIGN PATENT DOCUMENTS

| | | |
|---|---|---|
| 0354882A2 | 2/1990 | European Pat. Off. . |
| 2185106 | 7/1987 | United Kingdom . |

*Primary Examiner*—Hezron Williams
*Assistant Examiner*—Rose M. Miller
*Attorney, Agent, or Firm*—Sughrue, Mion, Zinn, Macpeak & Seas, PLLC

[57] ABSTRACT

An optical vibration sensor includes a built-in blade provided with a system for reflecting light, a system for directing light onto the reflecting system, system for collecting the light reflected by the reflecting system and a system for analyzing the intensity and/or the frequency and/or the phase of the reflected light. The blade forms an integral part of an appropriately cut block.

20 Claims, 4 Drawing Sheets

OPTICAL VIBRATION SENSOR

BACKGROUND OF THE INVENTION

1. Field of the Invention

The present invention concerns an optical vibration sensor and in particular a sensor in which light reflected by a mirror attached to a member subject to the vibrations the parameters of which are to be measured is analyzed.

A vibration sensor of this kind is used to measure acceleration in the bars constituting the stator of a turbo-alternator, for example.

2. Description of the Prior Art

Observation indicates that the bars constituting the stator of a high power turbo-alternator can, over time, become subject to play caused by Laplace electromagnetic forces in association with progressive loosening of the retaining systems.

These forces are expressed mathematically by the product of the length L of the bar by the vector product of the current I flowing through the bar by the magnetic field B to which the bar is subjected.

These forces generate vibrations at twice the frequency of the current. If the turbo-alternator produces a 50 Hz current, the vibration frequency is therefore 100 Hz.

Nevertheless, other vibration frequencies may appear during maneuvers or changes to the operating conditions of the machine.

It is useful to be able to measure the frequency and the amplitude of vibration to which the bars of a turbo-alternator is subjected on a continuous basis, in order to be able to analyze phenomena that occur, to make a record of them and to schedule maintenance operations.

In the light of the foregoing, it would be beneficial to be able to use a "wideband" vibration sensor to obtain accurate information on the vibration status of various locations examined and to carry out accurate amplitude, phase and frequency measurements.

The presence of a high voltage on various bars of the stator makes it impossible to dispose on them conventional sensors connected galvanically to their electronic circuit.

Optical fibers are insulative and it is only natural to use them to produce a vibration sensor for use in areas in which a high electric voltage is present.

One aim of the present invention is therefore to provide a fiber optic vibration sensor for measuring acceleration on a given axis with great accuracy and in a difficult environment.

One example of the design specifications required of the vibration sensor would be:

Measured frequency range: 10 Hz–1 500 Hz.

Measurement phase-shift at 100 Hz: <10 minutes of angle.

Measurement dynamic range at each frequency: 0.1 g to 100 g.

Measurement accuracy: ±2%

Transverse sensitivity: <0.1

The environment in which the sensor would have to operate to meet the requirements as stated above would be as follows:

Magnetic fields in the order of 1 Tesla.

High voltages in the order of 25 kV.

Relative pressure of hydrogen in the order of 4 bars.

Operating temperature between +10° C. and 120° C. with an ambient temperature variation of as such as 50° C. in 10 minutes.

Finally, the dimensions and the mass of the sensor must not exceed values incompatible with the intended application; in the case of a sensor used to determine vibration of turbo-alternator bars, the dimensions of the sensor must be approximately 15 mm×15 mm×30 mm, for example. The mass of the sensor is preferably less than 20 grams.

In looking to produce an optical vibration sensor, consideration has been given to the use of a sensor relying on the deflection of a built-in (or cantilever) beam by the inertial force due to its own mass: this deflection is measured optically, by directing light onto a reflecting surface attached to the vibrating beam and measuring the optical intensity collected after reflection at the mirror.

The state of the art in this field is defined by documents U.S. Pat. No. 4,581,528 and U.S. Pat. No. 4,649,271, which describe a vibration sensor in which a reflecting built-in beam subject to the vibrations to be measured receives incident light from an optical fiber and reflects this light into the same optical fiber.

The device described in the above two documents has various disadvantages.

Firstly, the vibrating beam is attached by glueing, which makes it fragile and unable to withstand the high operating temperatures or the temperature gradients referred to above.

To make the measurement independent of background illumination, in particular light back-scattered by the interfaces encountered by the incident light before it is reflected at the reflecting beam, the above documents propose to provide the beam with photo-luminescent means for producing a photo-luminescent signal and to analyze at the same time the light reflected by the beam and the photo-luminescent signal in order to deduce the luminous intensity actually reflected by the beam. This analysis requires the presence of members for deflecting the light, highly accurate optical filters and two measurement electronic systems. The analysis device must also include a lens to focus the photo-luminescent signal, the intensity of which is very low. It follows from the foregoing that the prior art sensors are both fragile and costly.

An aim of the invention is to provide a rugged and economic sensor.

SUMMARY OF THE INVENTION

The invention consists in an optical vibration sensor comprising a built-in blade forming an integral part of an appropriately cut block and provided with means for reflecting light, means for directing light onto the reflecting means, means for collecting the light reflected by the reflecting means and means for analyzing the intensity and/or the frequency and/or the phase of the reflected light.

The block is preferably made from a material having a coefficient of thermal expansion less than $0.1 \times 10^{-6}$.

The material of the block is advantageously a vitreous ceramic sold under the trademark "ZERODUR".

In a first embodiment the light reflecting means comprise a member provided with a reflective coating and glued to the top face of the blade over a hole therein.

Alternatively, the light reflecting means comprise a member provided with a reflective coating and glued to the bottom face of the blade.

Alternatively, the reflecting means comprise a reflective deposit on the bottom face of the blade.

The member is advantageously made from the same material as the blade.

The light directing means comprise a first or emitter optical fiber a stripped end of which is disposed perpendicularly to the reflecting member at a small distance therefrom.

The reflected light receiving means comprise a second or receiver optical fiber a stripped end of which is disposed perpendicularly to the reflecting member at a small distance therefrom.

The stripped ends of the emitter and receiver fibers are disposed side by side in a first capillary passage in a cylindrical ferrule having an inside diameter substantially equal to twice the diameter of a stripped optical fiber, the ferrule being disposed in a first cylindrical cavity in the block perpendicular to the plane of the blade.

The ferrule has a second capillary passage adjacent and coaxial with the first capillary passage and having a diameter substantially equal to twice the diameter of an optical fiber complete with its cladding.

The ferrule is immobilized in the first cavity by an adhesive.

The block comprises a second cavity perpendicular to the first cavity and communicating therewith, leading to the exterior of the block and receiving the emitter and receiver optical fibers.

The block is parallelepiped shape.

The block is disposed in a sealed casing.

The casing is filled with an insulative gas such as dry nitrogen.

The casing is made from the same material as the block.

The emitter and receiver optical fibers are immobilized in the second cavity by an adhesive.

The emitter and receiver optical fibers pass in a sealed manner through a wall of the casing by means of a sleeve made from the same material as the casing and glued thereto.

The invention will be clearly understood from a reading of the description of a preferred embodiment given with reference to the accompanying drawings.

DETAILED DESCRIPTION OF THE PREFERRED EMBODIMENTS

Before describing one embodiment of the invention, it would be as well to outline some principles of mechanics and dynamics.

If an object is subject to a sinusoidal displacement of the form:

$$d(t)=d_o . \sin \omega t$$

with d: amplitude $\omega$: angular frequency t: time the object is subject to an acceleration g which is the second derivative of the displacement:

$$g(t)=d''(t)=-\omega^2 . d(t)=-(\omega^2 d_o) . \sin \omega t$$

Note that this acceleration is proportional to the displacement.

If the movement of the object is alternating but not sinusoidal, it may be broken down into a Fourier series and represented by:

$$D(t)=\Sigma D_o . \sin (\omega_i t+\phi_i)$$

The acceleration of the object may be written:

$$\Gamma(t)=\Sigma -\omega_i^2 D_o . \sin (\omega_i t+\phi_i)$$

The classical laws of dynamics teach that if an object of mass m is subject to an acceleration (imposed by a particular displacement), it is then subject to an inertial force determined by the basic principle of dynamics:

$$F(t)=m.\Gamma(t)$$

Accordingly, measuring the displacement of an object is equivalent to measuring the inertial force acting on it.

The laws of the physics of solids teach that if an object is subjected to an external force (such as an inertial force), the object is deformed.

The stiffness of an object is characterized by its modulus of elasticity or Young's modulus.

The elongation $\Delta L$ of a bar of length L and cross-section a subjected to a force F is expressed by the equation:

$$\Delta L=(F/E)\times(L/a)$$

in which E is the modulus of elasticity of the material of the bar.

Accordingly, measuring the displacement d(t) of an object is equivalent to measuring its deformation.

An accelerometer is a system comprising an object that can be deformed by an inertial force generated by its displacement and a device for measuring this deformation.

In the optical sensor of the invention the deformable member is a built-in blade.

There follows an outline of the characteristics of a built-in or cantilever beam.

Using the following notation:

E: the modulus of elasticity of the material of the beam,
$\rho$: the density of the material,
<u>a</u>: the thickness of the beam,
l: the length of the beam,
$\epsilon$: the acceleration communicated to the beam, the following equations apply:
resonant frequency: $f=\frac{1}{2}\pi . (E/r)^{1/2} .a/l^2$
deformation: $Y_{MAX}=3\rho^4 2/Ea^2 . r$
blade deflection angle: $\theta_{MAX}=2\rho^3/Ea^2 . \Gamma$ Note that insensitivity to transverse vibration is easily obtained by making the width of the beam at least ten times greater than its thickness. The beam then becomes a plate or blade of thickness <u>a</u> and width <u>b</u>.

There follows an outline of some optical principles.

Figure 1:
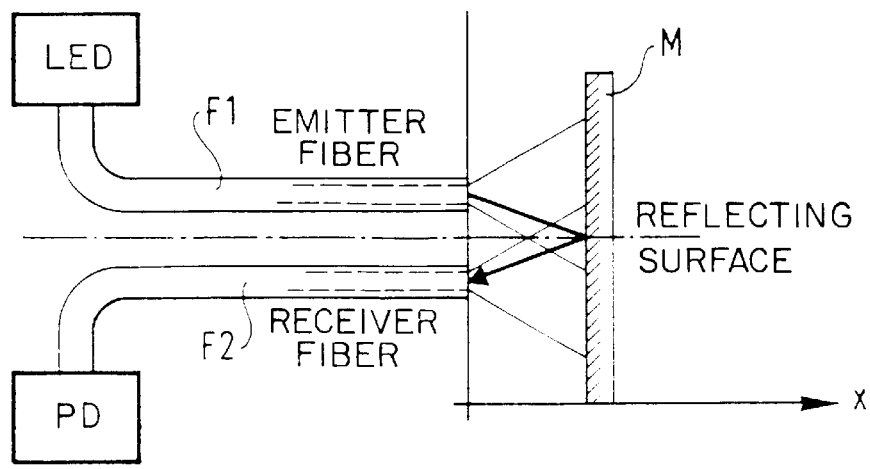
FIG. 1 is a diagram showing the optical coupling between two optical fibers.

As indicated above, measuring the vibration parameters is reduced to an optical measurement; the built-in blade of the sensor joined to the vibrating object is provided with a reflecting surface M (see FIG. 1) onto which incident light is directed via a first fiber F1; the light reflected by the reflecting surface M is collected in a fiber F2. The intensity of the light must be proportional to the displacement of the sensor.

Use is made of the fact that the displacement of the end of the built-in blade is proportional to the displacement of the sensor, as indicated by the equation given above.

Light emitted by a light-emitting diode LED, for example, is injected into the fiber F1 which can be a monomode or multimode fiber of any diameter. The end of the fiber is polished and held by a ferrule, as described below.

This ferrule also supports the second fiber F2, which is disposed parallel to the first fiber. This fiber receives the light reflected by the reflecting surface. A photodiode PD at the opposite end of the fiber F2 converts the luminous flux into a photo-current and then into a low electrical voltage processed by an electronic circuit described below.

Figure 2:
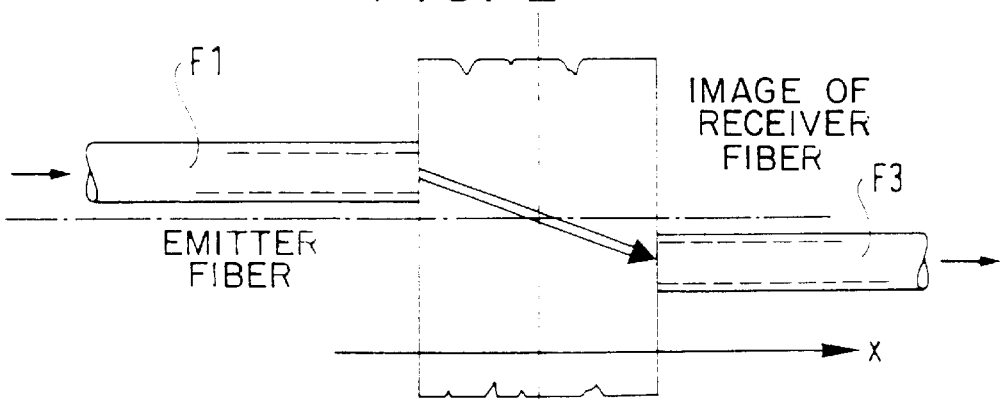
FIG. 2 is a diagram theoretically equivalent to the FIG. 1 diagram.

Note that the displacement of the reflecting surface causes the same luminous modulation I(t) from the fiber F1 towards the fiber F2 as the displacement of a fiber F3 relative to the fiber F1 where the fiber F3 is the image of the fiber F2 in the reflecting surface (see FIG. 2).

It is therefore easy to determine (theoretically and experimentally) the luminous power P(x) coupled from the fiber F1 into the fiber F2 by moving the fiber F3 away by an amount $\underline{x}$ that can be varied from zero to infinity.

Figure 3:
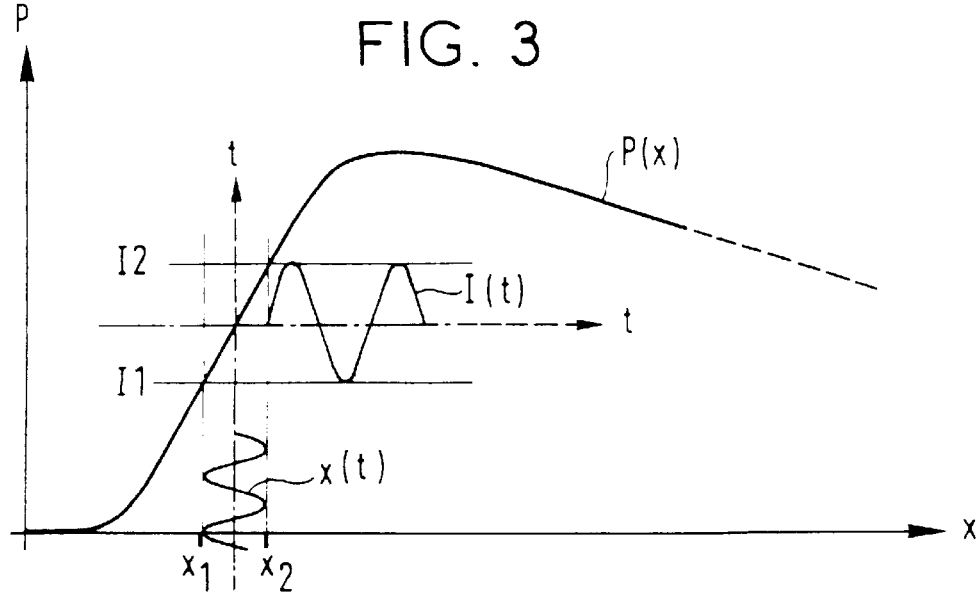
FIG. 3 is a diagram showing the phenomenon of optical coupling between the emitter fiber and the receiver fiber.

FIG. 3 shows the variations in the luminous power P as a function of the distance $\underline{x}$ between the ends of the fibers F1 and F3; there is found to be a linear area in which the luminous power is proportional to $\underline{x}$ and therefore to the displacement of the reflecting surface.

Provided that the ends of the fibers F1 and F2 are at a distance from the reflecting surface that corresponds to the rectilinear part of the FIG. 3 curve, the luminous intensity I(t) collected in the fiber F2 may be expressed by the equation:

$$I(t) = \alpha \cdot I_o(1 + k \cdot d(t))$$

with:

α: luminous transmission coefficient of the complete optical system, $\underline{k}$: sensitivity coefficient of the cantilever blade, d(t): displacement of the sensor as a function of time $\underline{t}$.

Figure 4:
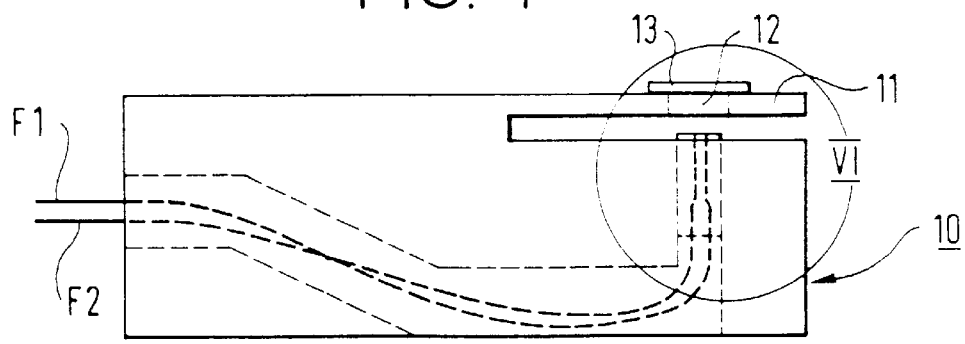
FIG. 4 is an elevation view of the block constituting the main part of the optical sensor of the invention.
Figure 5:
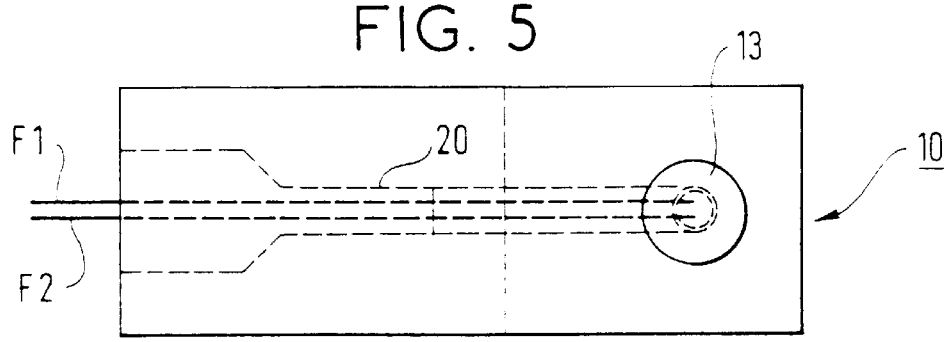
FIG. 5 is a top view of the same block.
Figure 6:
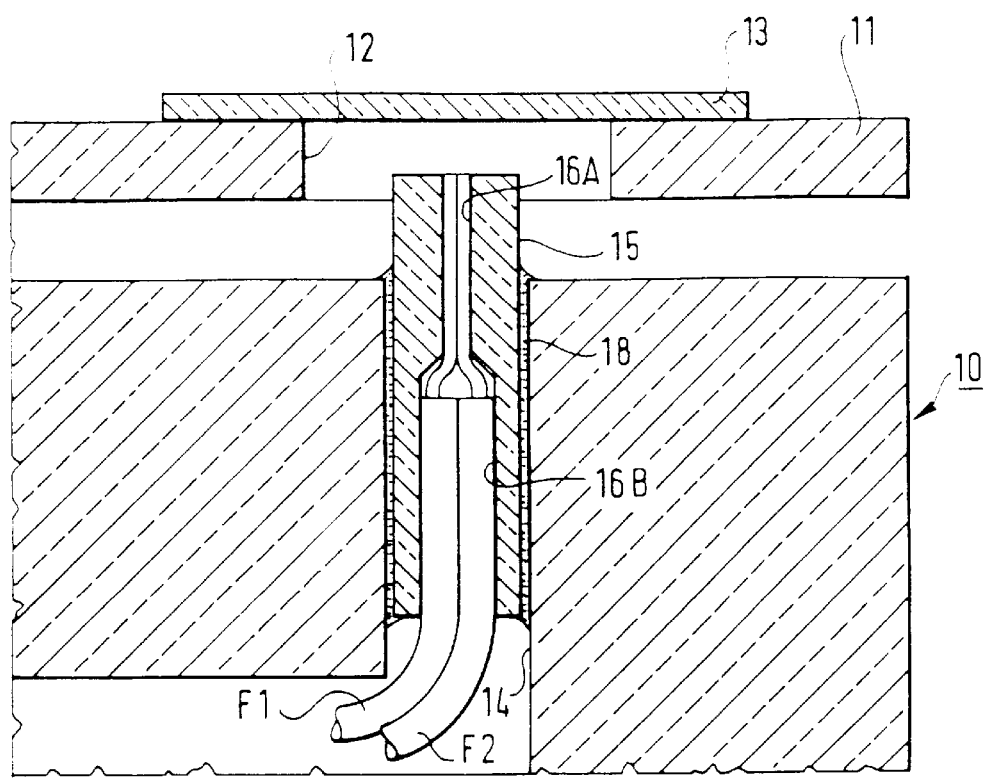
FIG. 6 shows part of FIG. 2 to a larger scale.

Refer now to FIGS. 4 through 6.

In accordance with the main feature of the invention, a block 10 that is preferably parallelepiped-shape is machined to define a thin blade 11 the width of which is equal to one of the dimensions of the block. In order to resist without fracture the temperature gradients referred to above, the material of the block is preferably a vitreous ceramic with a coefficient of thermal expansion between $0.1 \times 10^{-6}$ and $0.01 \times 10^{-6}$. A material of this kind is sold by SCHOTT under the trademark "ZERODUR".

The dimensions of the blade are chosen to satisfy the specifications stated above, which require a resonant frequency greater than or equal to 2 000 Hz.

The following dimensions may be chosen, for example:

blade length: 15 mm blade width: 10 mm blade thickness: 0.5 mm

The use of a monolithic part avoids the glueing of the blade as referred to in the prior art, which makes the apparatus fragile; furthermore, the softening of glues above a certain temperature, for example 100° C. causes variations in the sensitivity and the resonant frequency of the blade. The solution of the invention, whereby the blade is an integral part of the block, avoids these drawbacks.

It is necessary to consider as falling within the scope of the invention a block associated with a blade attached irreversibly to the block by a mechanical process, for example by pressing perfectly polished surfaces of the blade and the block together under a high pressure and without any glue, in a similar manner to that used to attach together two metal parts.

In a preferred embodiment, shown in FIGS. 4 through 6, the reflecting surface is a mirror 13 glued over a hole in the blade 11. This mirror is advantageously a thin disk machined from the same material as the block (preferably ZERODUR) and subjected to a reflective treatment on one face. The diameter of the disk 13 is greater than that of the hole 12 and the disk is glued to the blade 11.

The mirror is of low mass in order not to add to the mass of the built-in blade 11. For example, the mirror has a diameter of 3 mm and a thickness of 250 μm.

Figure 7:
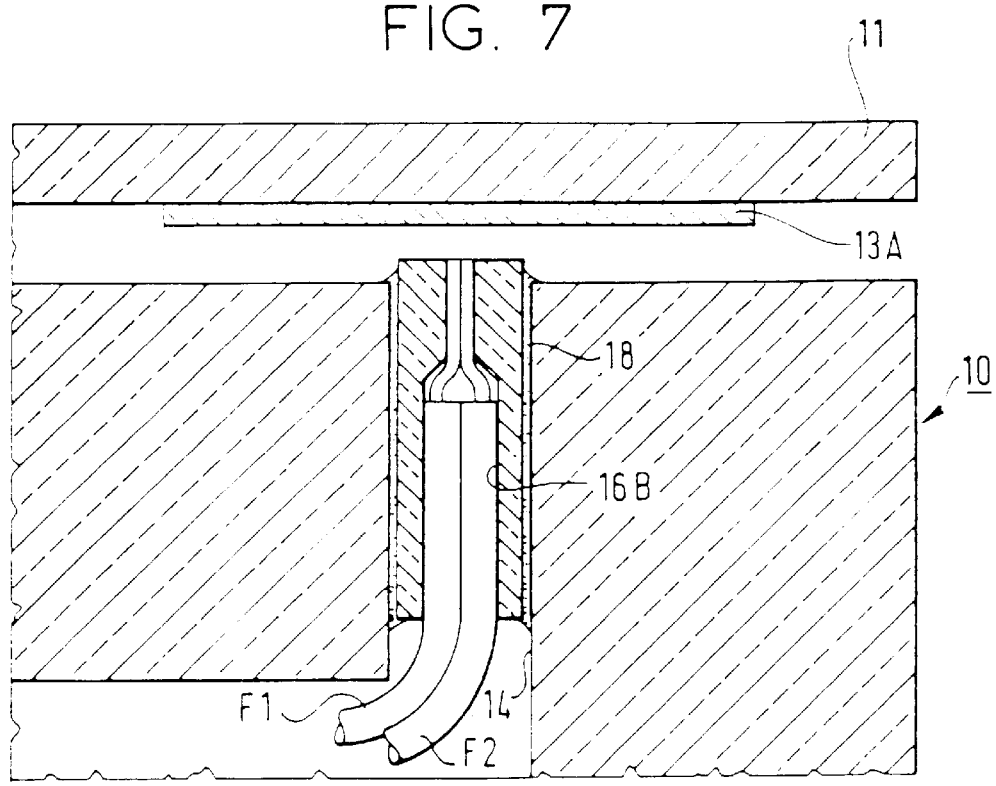
FIG. 7 shows a first variant of the same part of FIG. 2 to a larger scale.

In a first variant, shown in FIG. 7, the mirror 13A is glued to the bottom of the blade 11; the hole 12 is dispensed with in this case.

Figure 8:
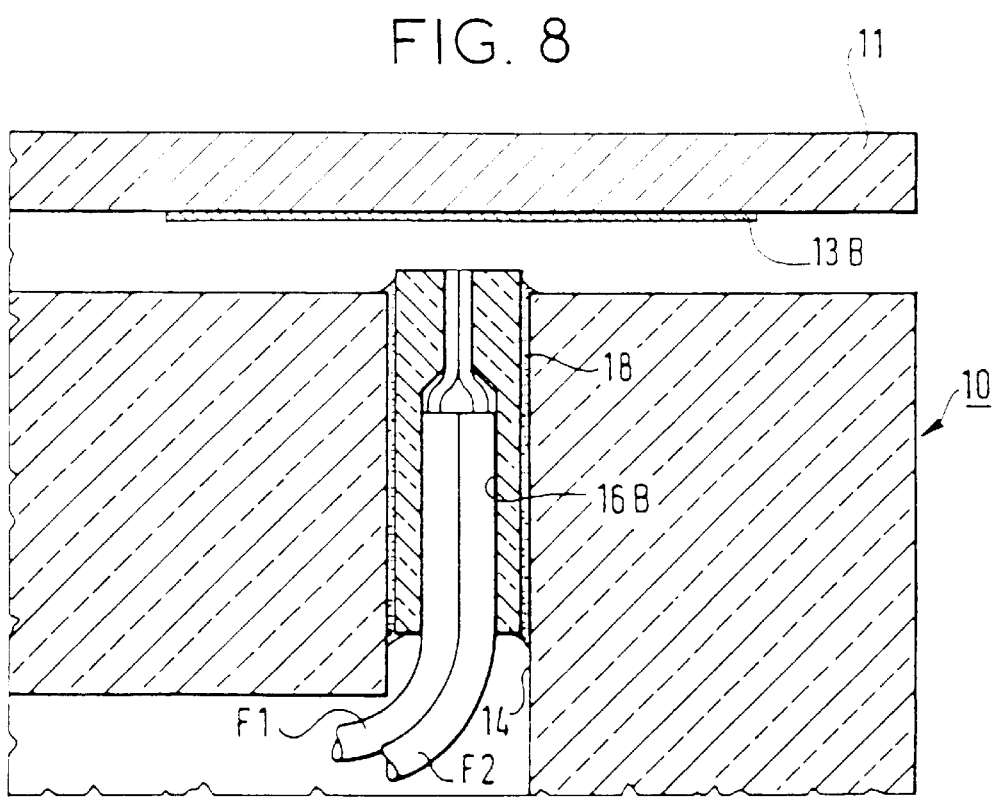
FIG. 8 shows a second variant of the same part of FIG. 2 to a larger scale.

In a second variant, shown in FIG. 8, the mirror 11 is replaced by polishing and the application of a reflective treatment 13B to the bottom face of the blade 11; the hole in the blade in also dispensed with in this case.

Refer again to FIGS. 4 through 6. The following considerations apply equally, mutatis mutandis, to the FIG. 7 and 8 variants.

A cylindrical cavity 14 is bored in the block 10, perpendicularly to the blade 11 and coaxially with the mirror 13. This cavity is intended to receive a ferrule 15 containing the ends of the optical fibers F1 and F2. The ferrule 15 comprises two consecutive capillary axial passages 16A and 16B; the passage 16A, the diameter of which is in the order of 250 μm, contains the stripped fibers F1 and F2 (i.e. the fibers without their plastics material cladding) disposed side by side; the passage 16B, which has a greater diameter than the passage 16A, for example 800 μm, receives the two optical fibers complete with their cladding. The stripped fibers are flush with the end of the ferrule and are polished to obtain the optical coupling described above. An antireflection treatment may be provided to limit the amount of unwanted reflected light.

The distance between the mirror and the end of the ferrule is adjusted so that the optical coupling between the fibers corresponds to the rectilinear part of the FIG. 3 curve. When this adjustment has been done the ferrule 15 is immobilized in the cavity 14 by means of an adhesive 18.

The ferrule must have the lowest possible coefficient of thermal expansion if it is to comply with the specifications. Because it is difficult in the current state of the art to construct capillary ferrules from ZERODUR, a silica ferrule is selected, even though its coefficient of expansion is five times greater than that of ZERODUR. Given the small diameter of the ferrule (in the order of 1.6 mm), differential expansion between the ferrule and the block is small and is compensated by a slight clearance between the ferrule 15 and the cavity 14, this clearance not compromising the glueing of the ferrule.

The block 10 incorporates a second cylindrical cavity 20 substantially perpendicular to the first cavity 14 and opening into the latter, extending parallel to one of the larger faces of the parallelepiped-shape block and opening onto one of its smaller faces. This cavity provides a guide for the fibers F1 and F2 which leave the block through the aforementioned smaller face. The fibers F1 and F2 are immobilized inside the cavity 20 by means of an adhesive.

Figure 9:
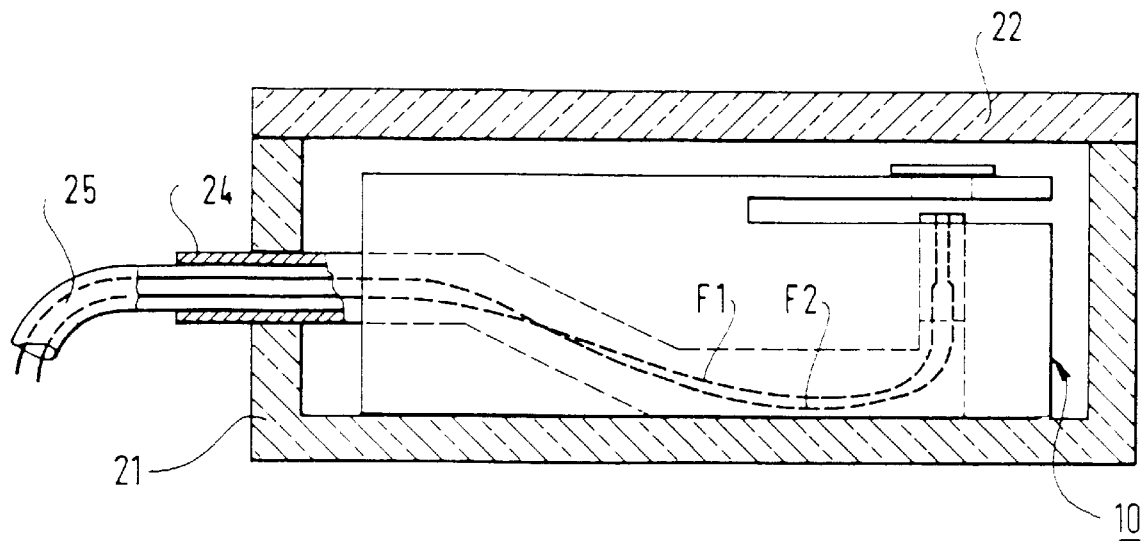
FIG. 9 is a sectional view of the sensor comprising the block and its casing.

As shown in FIG. 9, the block 10 is contained within a sealed casing 21 that is preferably made from a block of ZERODUR hollowed out to receive the block 10 and provided with a lid 22 of the same material that is glued on to seal the casing 21.

The casing contains a neutral gas, for example dry nitrogen.

The block is preferably glued to the interior of the casing using a glue having the property of transmitting vibration well so that it does not falsify the measurement. One such glue is HBM X60. When dry, this glue is temperature resistant and has a hardness comparable with that of ceramic.

A ZERODUR ferrule 24 provides a sealed feed-through for the optical fibers; the ferrule is glued to the wall of the casing; the fibers are retained in the ferrule by a glue that also seals the feed-through. On leaving the casing the fibers F1 and F2 are enclosed in a plastics material sheath 25 the composition of which is resistant to the hydrogen that is present in the environment of the output bars of turbo-alternators.

Figure 10:
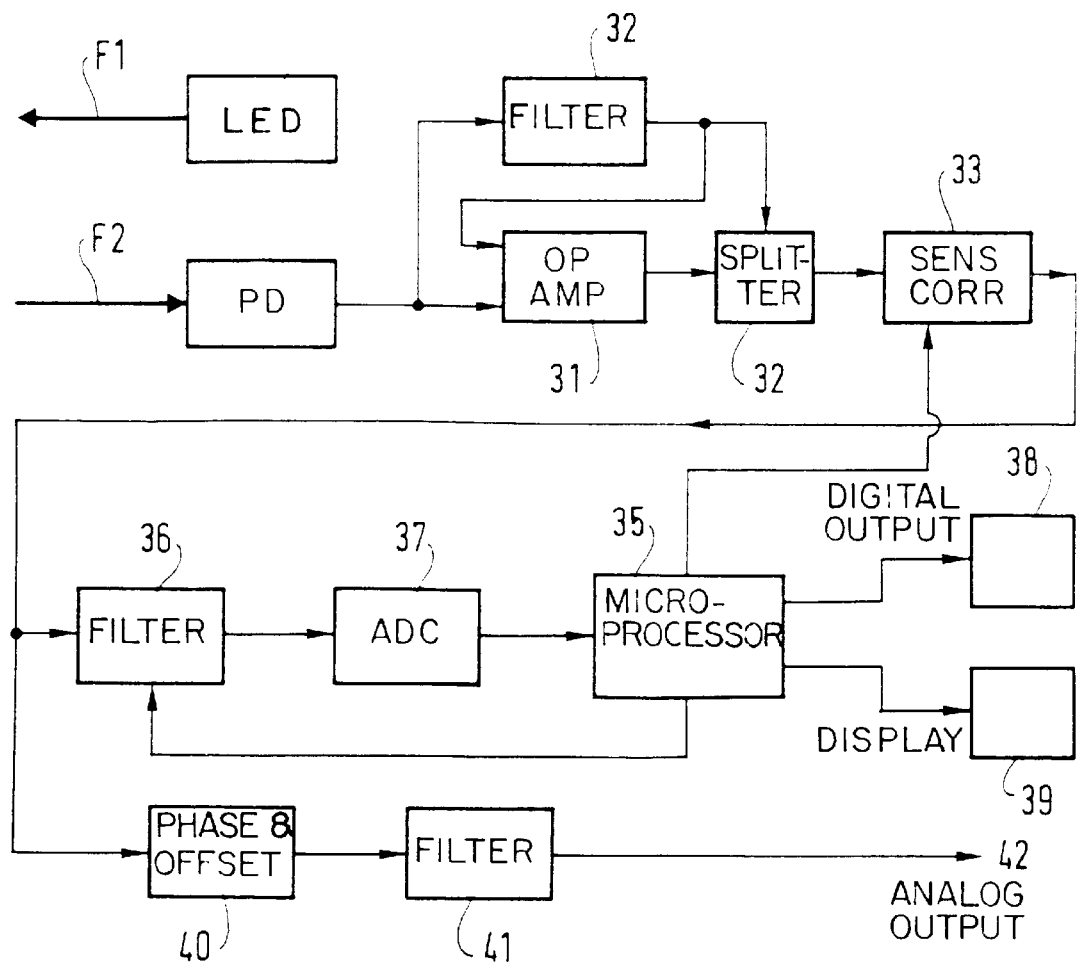
FIG. 10 is a block diagram of the sensor electronics.

FIG. 10 is a block diagram of the sensor electronics.

The signal from the receiver photodiode PD is fed to an operational amplifier 31 provided with a low-pass filter 32; from the output of the amplifier, the signal is fed to a splitter 32 and thence to a sensitivity corrector circuit 33 controlled by a microprocessor 35. The signal is filtered by a frequency-selective filter 36 controlled by the microprocessor and then digitized by a converter 37 before it is fed to the microprocessor. The latter calculates the amplitude of the vibration and supplies the root mean square value at a digital output 38 and to a display 39. The signal is also supplied in analog form at an output 42 after phase adjustment and offset correction (circuit 40) and filtering (circuit 41).

The sensor of the invention applies particularly well to measuring vibration of turbo-alternator output bars because its design enables it to withstand the difficult operating conditions.

The use of separate emitter and receiver optical fibers avoids the problem of the length of fiber used and unwanted deflections that may be operative if a single fiber is used in association with photo-luminescent means, in which case the fiber must be provided with focusing, coupling and/or deflector means.

The sensor of the invention does not use any focusing lens, which would otherwise raise problems of glueing in the environment and complicate the sensor by the need to provide a mirror.

There is claimed:

1. An optical vibration sensor for determining the vibrational parameters of a vibrating body, said optical sensor comprising:
   a block having an integrally formed blade which is physically independent of said vibrating body, said blade having an outer face and an inner face opposing an interior surface of said block:;
   light reflecting means provided on said blade for reflecting a constant amount of light toward said interior surface of said block;
   light directing means for directing light onto said reflecting means;
   light receiving means for receiving the constant amount of light reflected by said light reflecting means; and
   analyzing means operationally coupled to said light receiving means for analyzing at least one of an intensity, a frequency, and a phase of said reflected light.

2. The optical sensor as claimed in claim 1, wherein said block is made from a material having a coefficient of thermal expansion less than $0.1 \times 10^{-6}$.

3. The optical sensor as claimed in claim 2, wherein said material of said block is a vitreous ceramic sold under the trademark "ZERODUR".

4. The optical sensor as claimed in claim 1, wherein said light reflecting means comprises a member provided with a reflective coating, said member glued to the outer face of said blade over a hole therein.

5. The optical sensor as claimed in claim 4, wherein said member is made from the same material as said blade.

6. The optical sensor as claimed in claim 1, wherein said light reflecting means comprises a member provided with a reflective coating, said member glued to the inner face of said blade.

7. The optical sensor as claimed in claim 1, wherein said light reflecting means comprises a reflective deposit provided on the inner face of said blade.

8. The optical sensor as claimed in claim 1, wherein said light directing means comprises an emitter optical fiber having a stripped end disposed perpendicularly to said light reflecting means.

9. The optical sensor as claimed in claim 8, wherein said light receiving means comprises a receiver optical fiber having a stripped end disposed perpendicularly to said light reflecting means.

10. The optical sensor as claimed in claim 9, further comprising a ferrule disposed in a first cavity in said block perpendicular to said blade, wherein said stripped ends of said emitter and said receiver optical fibers are disposed side by side in a first capillary passage in said ferrule.

11. The optical sensor as claimed in claim 10, wherein said ferrule has a second capillary passage communicating and coaxial with said first capillary passage.

12. The optical sensor as claimed in claim 10, wherein said ferrule is fixed in said first cavity by an adhesive.

13. The optical sensor as claimed in claim 10, wherein said block comprises a second cavity perpendicular to said first cavity and communicating therewith, said second cavity leading to an exterior of said block and receiving said emitter and said receiver optical fibers.

14. The optical sensor as claimed in claim 13, wherein said emitter and said receiver optical fibers are fixed in said second cavity by an adhesive.

15. The optical sensor as claimed in claim 1, wherein said block is parallelepiped shape.

16. The optical sensor as claimed in claim 1, wherein said block is disposed in a sealed casing.

17. The optical sensor as claimed in claim 16, wherein said sealed casing is filled with an insulative gas.

18. The optical sensor as claimed in claim 16, wherein said sealed casing is made from the same material as said block.

19. The optical sensor as claimed in claim 16, wherein said light directing means and said light receiving means pass in a sealed manner through a wall of said sealed casing via a sleeve made from the same material as said sealed casing.

20. The optical sensor as claimed in claim 1, wherein said blade is cantilevered.

\* \* \* \* \*